Inventors
ALOIS BAUMEISTER
JOSEF VRASTIL
by: Wolfe, Hubbard, Voit & Osann
Attorneys

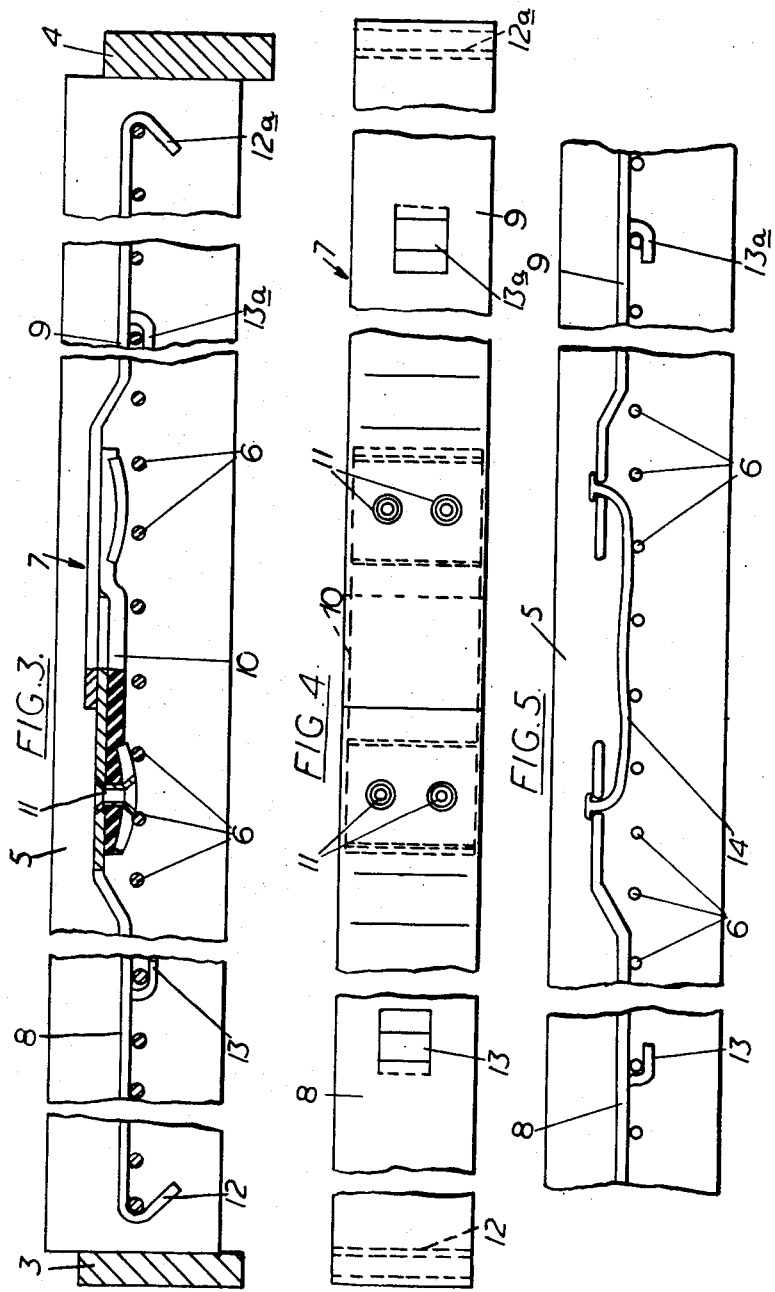

United States Patent Office 3,191,607
Patented June 29, 1965

3,191,607
COVER STRIP FOR THE CONCAVE ON THRESHING MACHINES
Alois Baumeister and Josef Vrastil, Eschwege, Germany, assignors to Massey-Ferguson G.m.b.H., Westhoven, Germany
Filed Feb. 6, 1963, Ser. No. 256,618
Claims priority, application Germany, Feb. 6, 1962, M 40,373, Patent 1,850,233
4 Claims. (Cl. 130—27)

This invention relates to the concaves of threshing machines i.e. the concave member positioned adjacent the surface of the threshing cylinder and which cooperates therewith to bring about the threshing action.

It is desirable, in order that a threshing machine may be used for a wide range of crops, that the threshing action between the threshing cylinder and the concave may be varied, and to this end it has been proposed to cover the spaces between the ribs of the concave to provide a smooth surface giving an increased threshing effect. Hitherto, proposed concave covers have been attached to the concave by screwing or clamping which has the disadvantage that the fixing of the covers is time-consuming and troublesome. Moreover, there is the danger that loose parts or tools may be left in the concave so that damage can be caused when the machine is re-started.

It is an object of the present invention to obviate or mitigate the above disadvantages.

In accordance with the present invention a cover or cover strip is provided to seat upon the concave including bar-engaging members or hooks which grip widely spaced ones of the bars forming the concave under the action of an elastic member secured to the cover. More specifically in accordance with the invention the cover is formed of left and right hand portions with oppositely facing bar-engaging members and with the two portions being joined by elastic so that the bar-engaging members are resiliently urged into their seated positions.

Preferably the elastic interconnection is of rubber or other synthetic resinous material.

Embodiments of the invention will now be described by way of example with reference to the accompanying drawings, in which:

FIG. 3 is an enlarged part-sectional elevation on the line III—III of FIG. 2;

FIG. 4 is a plan view of FIG. 3; and

FIG. 5 is a view similar to FIG. 3 showing a modification.

Figures 1, 2:
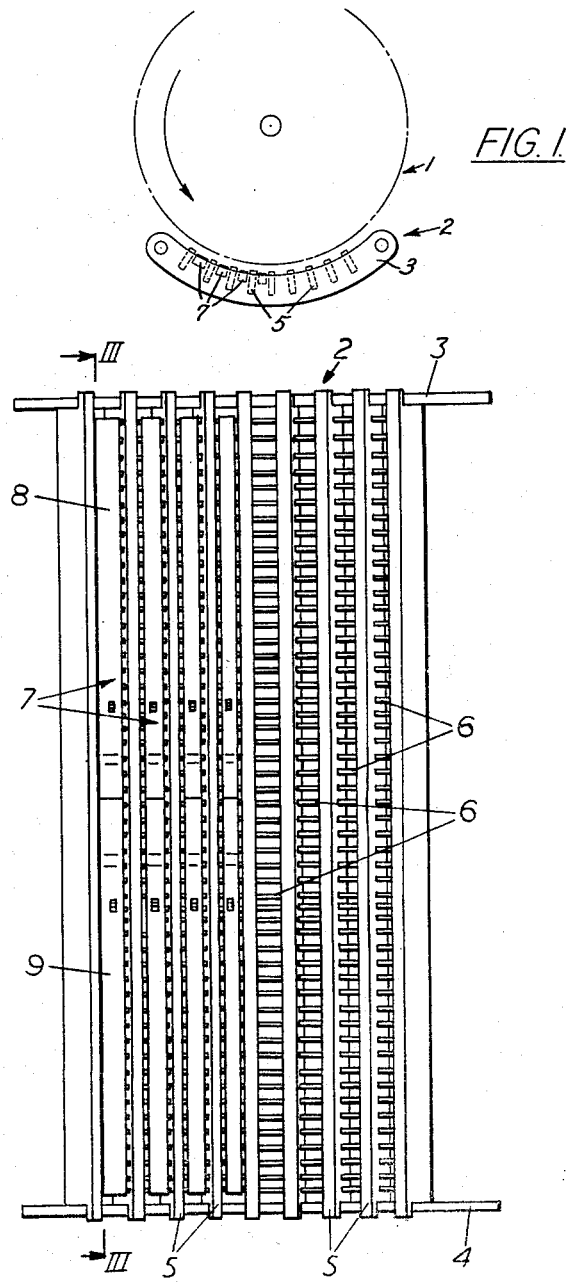
FIG. 1 is a diagrammatic side elevation of a threshing cylinder and a concave embodying the invention.
FIG. 2 is a plan view of the concave.

Referring to the drawing the threshing cylinder is indicated by 1 and the concave by 2. The concave consists of a pair of parallel side members 3, 4, spaced apart by ribs 5 and having bars 6 running parallel to the sides 3, 4. The spaces between the ribs are closed by cover strips indicated by 7. Although some only of the spaces are shown covered in FIGS. 1 and 2, all or any selected number may be so covered in practice.

Each cover strip 7 is preferably made of two parts 8 and 9, right and left hand, which are interconnected by means of an elastic tension member 10 (FIGS. 3 and 4) formed from rubber which is secured to adjacent ends of the parts 8 and 9 by rivets 11. Hooked locating members 12, 13 and 12a, 13a, are provided on the underside of each part of the cover strip at the outer ends and at points adjacent the inner ends thereof respectively, and are adapted to hook over the bars 6 of the concave. The open portions of these locating members face in opposite directions, here towards the center of the cover strip.

In use, the cover strip is placed above the concave, the two ends are pulled apart so that the elastic tension member 10 is stretched and the cover is pressed against the bars 6 so that the locating members pass between the bars. The ends are then released and the elastic tension member 10 pulls the parts together till the locating members 12, 13 and 12a, 13a engage widely spaced ones of the bars 6, respectively. Thus both parts of the cover strip are oppositely tensioned by means of the elastic tension member 10 and are prevented from displacement by means of the locating members 12, 13 engaging the bars 6.

To remove the cover strip, one of the parts is pulled outwards against the action of the elastic tension member and the locating members 12, 13, or 12a, 13a, on that part are disengaged from the bars 6. The locating members on the other part can then be easily disengaged as there is no tensioning effect from the elastic tension member.

In the modification shown in FIG. 5 the rubber tension member is replaced by a spring steel member 14 which in the untensioned position takes up a substantially arcuate form, and which may be tensioned longitudinally of the strip by pulling the parts 8 and 9 apart. With the cover strip in place the parts 8 and 9 are released and the spring steel member 14 assumes the position shown in which it tends to pull the parts 8, 9 together and the hooked portions 12, 13 into engagement with the bars 6.

In a further modification of the two parts 8, 9 of the strip may be formed wholly of rubber and the hooked portions may be molded into the rubber or may be integral therewith.

By virtue of the invention the time necessary for the fitting and removing of the cover strip is reduced and no tools or loose fastening parts are necessary. Moreover the nature of the cover strip is such that vibration is reduced to a minimum.

We claim as our invention:

1. For use with a threshing concave defined by a plurality of spaced longitudinally extending ribs and a plurality of concave bars arranged side by side in spaced relation transversely interconnected to the ribs, a concave cover for seating upon and covering said bars, said cover being formed of left and right hand portions, said left and right hand portions being provided with oppositely facing hooks on the underside for engaging widely spaced ones of said bars when the portions of the cover are moved axially in opposite directions, and elastic means between said portions for urging said portions in said opposite directions.

2. The combination with a threshing concave defined by a plurality of spaced longitudinally extending ribs and a plurality of concave bars arranged side by side in spaced relation transversely interconnected to the ribs, of a cover plate comprising left and right hand portions having hooks on the underside for engaging widely spaced ones of said bars, elastic means interposed between the portions of the plate for drawing such portions together, the hooks on the two portions being in opposed relation for firm seated engagement with the associated bars incident to said plate portions being drawn together.

3. The combination with a threshing concave defined by a plurality of spaced longitudinally extending ribs and a plurality of concave bars arranged side by side in spaced relation transversely interconnected to the ribs, of a cover plate comprising left and right hand portions each having a plurality of hooks spaced axially on the underside thereof for engaging spaced ones of said bars, elastic means interposed between the portions of the plate for drawing such portions together, the hooks on the two portions being in respectively opposed relation for firm seated engagement with the associated bars incident to said plate portions being drawn together.

4. The combination with a threshing concave defined by a plurality of spaced longitudinally extending ribs and a plurality of concave bars arranged side by side in spaced relation transversely interconnected to the ribs, of a concave cover for seating upon and covering said bars, comprising left and right hand portions, said left and right hand portions being provided on their underside with opposed bar-engaging means of narrow width dimensioned for insertion between adjacent bars and for engaging widely spaced ones of said bars when the portions of the cover are moved axially in opposite directions, and elastic means between said portions for urging said portions in opposite directions.

References Cited by the Examiner
UNITED STATES PATENTS

| | | | |
|---|---|---|---|
| 2,159,664 | 5/39 | Lindgren | 130—27.9 |
| 2,686,523 | 8/54 | Young | 130—27.9 |

T. GRAHAM CRAVER, *Primary Examiner.*

ANTONIO F. GUIDA, *Examiner.*